June 23, 1931.  O. NEUBERT, JR  1,811,208
DOUGH MOLDING MACHINE
Filed Nov. 2, 1929  3 Sheets-Sheet 2
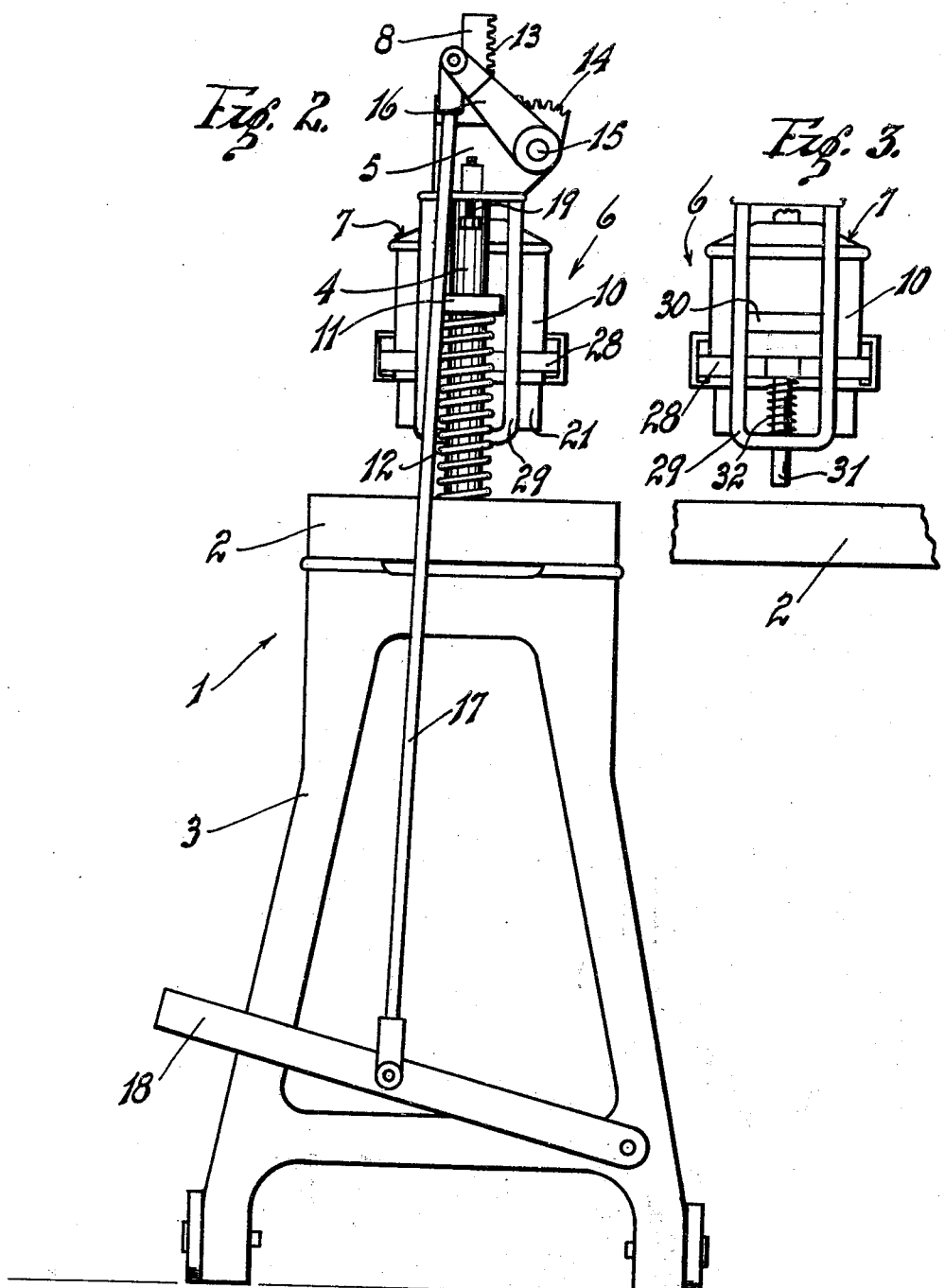
INVENTOR
OSCAR NEUBERT, JR.
BY
ATTORNEY

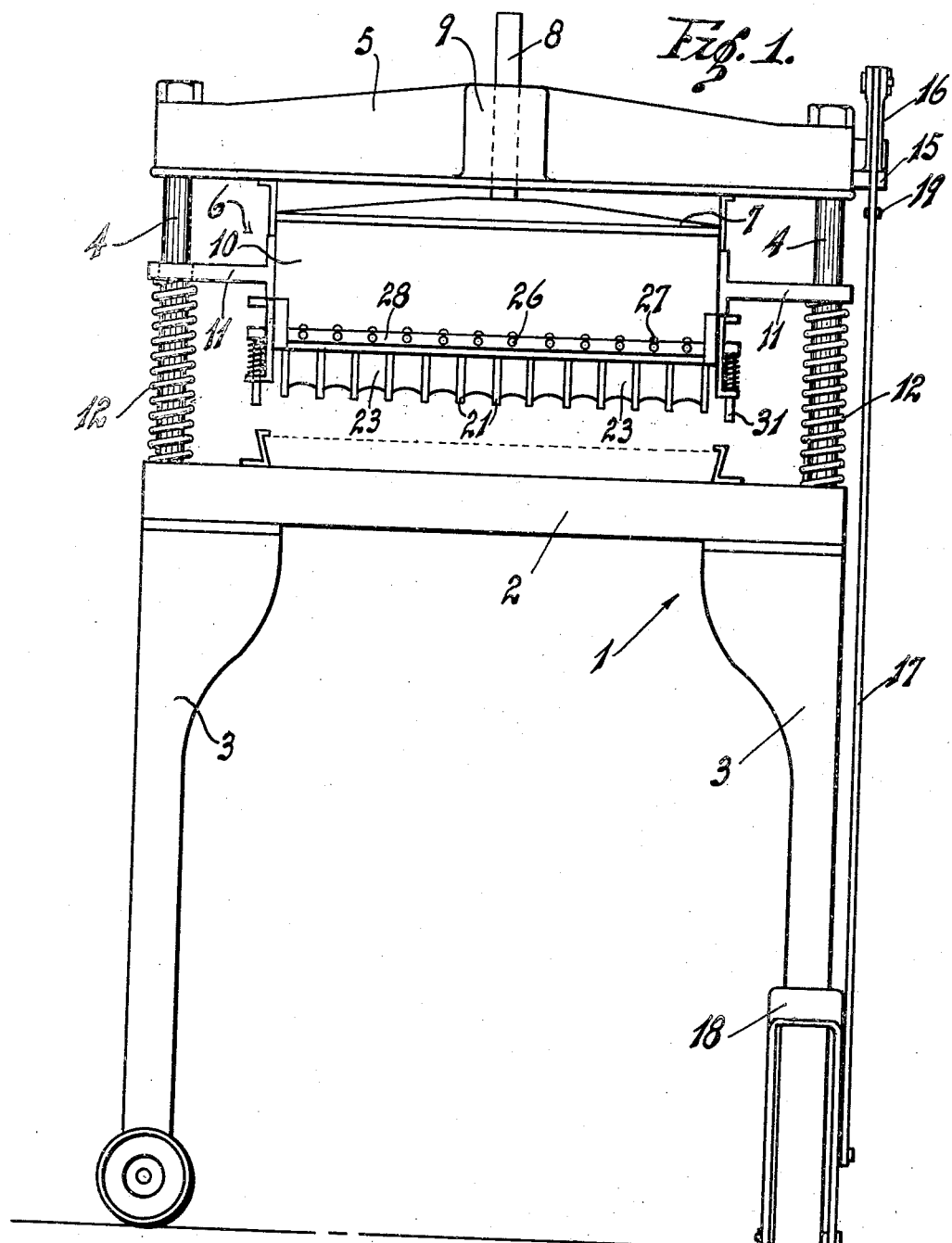

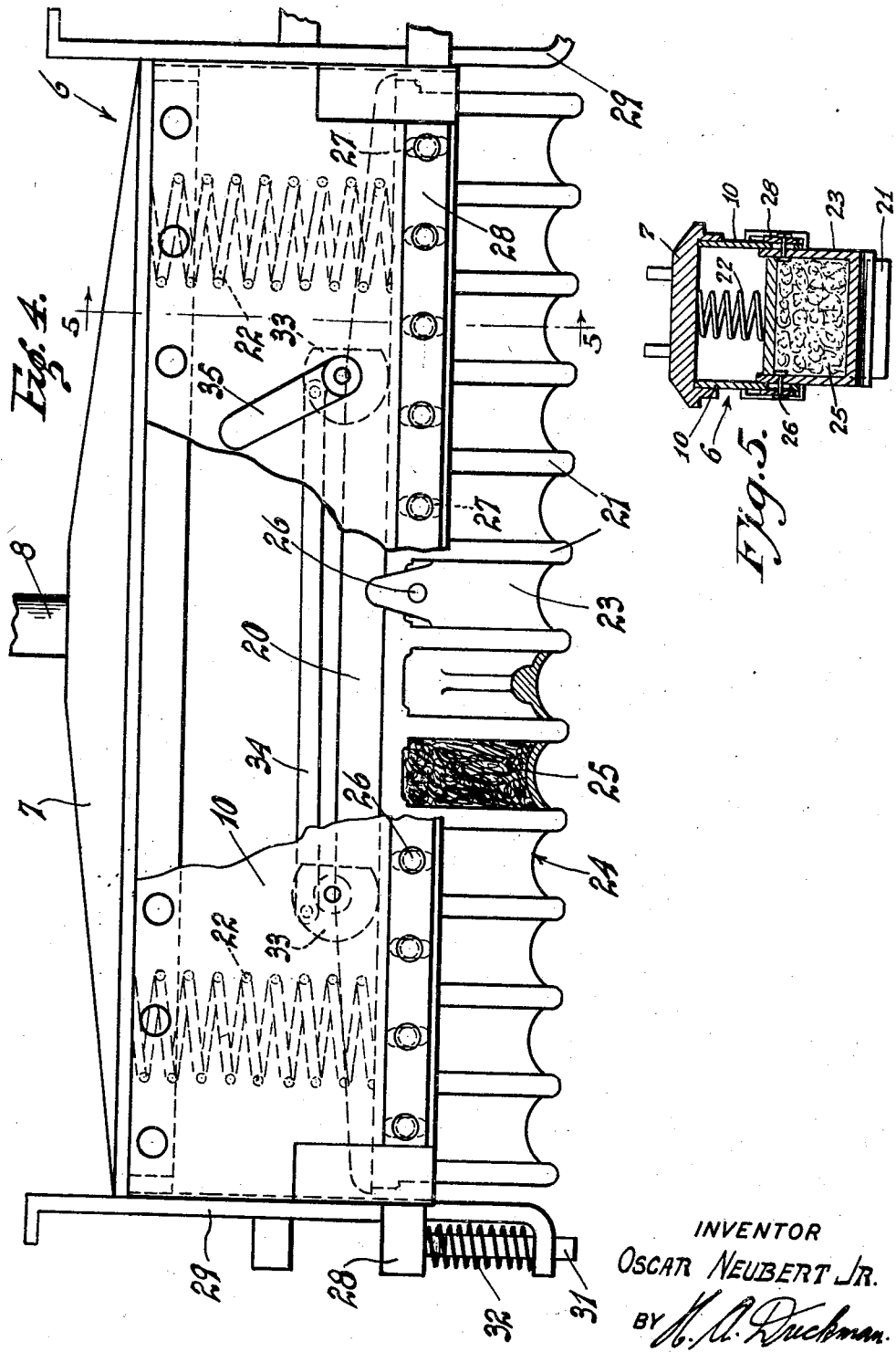

Patented June 23, 1931

1,811,208

UNITED STATES PATENT OFFICE

OSCAR NEUBERT, JR., OF LONG BEACH, CALIFORNIA

DOUGH MOLDING MACHINE

Application filed November 2, 1929. Serial No. 404,296.

This invention relates to a dough molding and dividing machine particularly applicable for the molding of rolls or the like.

An object of my invention is to provide a molding machine which includes a plurality of knives which are pressed through the dough, said knives being followed by molding blocks which elongate the dough into the final shape.

Another object is to provide a power machine in which the dividing knives are yieldably pressed into the dough prior to the action of the molding blocks.

Other objects, advantages and features of invention may appear from the accompanying drawings, the subjoined detailed description and the appended claims.

In the drawings

Figure 1 is a front elevation of my machine.

Figure 2 is an end view of the same.

Figure 3 is a fragmentary end view of the head.

Figure 4 is a front view of the head on an enlarged scale, with parts broken away to show interior construction.

Figure 5 is a sectional view on a reduced scale taken on line 5 of Figure 4.

Referring more particularly to the drawings, the frame 1 of my machine includes a bed plate 2 and a plurality of legs 3 depending therefrom. A pair of posts 4—4 rise from the bed plate 2, one being at either end of the plate. A beam 5 extends horizontally between the posts 4—4 and is secured to said posts. A molding head 6 is reciprocally mounted under the beam 5, and between the posts 4—4, and this head comprises a top plate 7 from which a guide post 8 rises. The post 8 is secured to, or is integrally formed with the plate 7 and is guided in a journal 9 formed in the beam 5.

An apron 10 is secured to the plate 7 by means of screws, stud bolts or the like, and this apron has secured to either side thereof a guide arm 11—11. Each of the guide arms is provided with a suitable opening through which the post 4 extends. The guide arms 11—11 together with the post 8 guide the head 6 as it moves upwardly or downwardly.

A coil spring 12 surrounds each of the posts 4—4 and is positioned between the bed plate 2 and the guide arm 11. These springs return the head 6 to its normal raised position as will be further described. The post 8 is provided with rack teeth 13 and a gear segment 14 meshes with the teeth 13. The gear 14 is secured to a shaft 15 which extends horizontally and is journaled on the beam 5. An arm 16 is secured to the outer end of the shaft 15 and this arm is swung through a link 17 which link is pivotally secured to a foot pedal 18. The throw of the arm 16 is limited by an adjustable stop 19. This stop consists of a set screw which extends through the beam 5 and engages the lower edge of the arm 16 when said arm is depressed, thus the downward movement of the head 6 is regulated.

Returning again to the head, a knife assembly plate 20 is reciprocally mounted inside of the apron 10 and from the lower edge of this plate I provide a plurality of downwardly extending cutting or separating knives 21. The lower edges of the knives are rounded so that the dough is not sharply cut but the top skin is drawn downwardly during the separating action all of which tends to make a better looking and nicer baking roll.

A pair of springs 22—22 are positioned inside of the head 6 and press against the top of the plate 20 and the bottom of the top plate 7. Between each of the knives 21 I provide a molding block 23, the lower surface of which is curved as at 24 so that the top of the rolls are nicely rounded. The blocks 23 descend after the knives 21 have divided the dough and the blocks then mold or press the dough lengthwise the required amount. The blocks 23 are substantially U-shaped so that a space is provided above the lower face of the block and betwen the adjacent knives 21 in which an oil retaining fibre substance 25 is placed.

The wicks 25 are thoroughly saturated with oil and this oil is spread upon the knives 21 as the blocks 23 reciprocate. The blocks 23 are each provided with outwardly extending pins 26, which pins extend through elongated slots 27 in the apron 10. A band 28 extends around the head 6 and all of the pins 26 are secured therein.

A U-shaped guide frame 29 is secured to the beam 5 and depends therefrom. A stop 30 is provided in the guide frame 29 against which the band 28 strikes as the head 6 moves into its raised position, thereby forcing the band downwardly which causes all of the blocks 23 to slide down adjacent the lower edge of the knives 21 whereby said knives are more effectively oiled. Guide pins 31 depend from either end of the band 28 and extend through the lower outwardly turned end of the frame 29, thus guiding the band in its movement.

A coil spring 32 surrounds each of the guide pins 31 for the purpose of yieldably urging the band 28 upwardly.

In operation a tray of dough is placed under the head 6 upon the bed plate 2 and the operator steps upon the foot pedal 18. This causes the gear 14 to rotate, which depresses the post 8 and will move the topping plate 7 downward. The entire head 6 moves and the knives 21 are carried into the dough and are yieldably pressed therein by the springs 22. A further downward movement of the post 8, plate 7 and apron 10 will cause the blocks 23 to move downwardly and mold or stretch the dough the required amount.

I have found that plating the rounded surfaces 24 will prevent the dough from sticking to the molding blocks. The knife plate 20 may be locked to the apron 10 so that the springs 22 are ineffective by means of a pair of cams 33—33, which cams are journaled in the apron 10 and are connected by a link 34. A handle 35 secured to one of the shafts upon which the cam 33 is secured will serve to rotate both of the cams simultaneously so that they engage the knife plate 20 to hold it in its lowermost position and keep it from moving upwardly against the springs 22.

Having described my invention, I claim:

1. A dough molding machine comprising a frame, a head reciprocally mounted in said frame, means to reciprocate said head, a knife plate in the head, a plurality of knives depending from said plate, said knives being spaced apart, molding blocks between adjacent pairs of knives, said blocks being slidably mounted between the knives and means securing all of said blocks together whereby they are simultaneously actuated, said knife plate being slidably mounted in the head and yieldable means bearing against the plate whereby said plate is normally urged downwardly.

2. A dough molding machine comprising a frame, a pair of posts rising from the frame, a head reciprocally mounted on said posts, spring means bearing against the head normally urging it upwardly, means engaging the head whereby said head is reciprocated, said head including a top plate, an apron depending from the said top plate, a knife plate slidably mounted in the apron, a plurality of spaced knives depending from the knife plate, molding blocks slidably mounted between adjacent pairs of knives, means coupling all of said molding blocks together, the lower surfaces of said molding blocks being curved upwardly whereby a rounded object is molded.

3. A dough molding machine comprising a frame, a pair of posts rising from the frame, a head reciprocally mounted on said posts, spring means bearing against the head normally urging it upwardly, means engaging the head whereby said head is reciprocated, said head including a top plate, an apron depending from the said top plate, a knife plate slidably mounted in the apron, a plurality of spaced knives depending from the knife plate, molding blocks slidably mounted between adjacent pairs of knives, means coupling all of said molding blocks together, the lower surfaces of said molding blocks being curved upwardly whereby a rounded object is molded, and spring means in the head bearing against said knife plate yieldably urging said knife plate downwardly.

4. A dough molding machine comprising a frame, a pair of posts rising from the frame, a head reciprocally mounted on said posts, spring means bearing against the head normally urging it upwardly, means engaging the head whereby said head is reciprocated, said head including a top plate, an apron depending from the said top plate, a knife plate slidably mounted in the apron, a plurality of spaced knives depending from the knife plate, molding blocks slidably mounted between adjacent pairs of knives, means coupling all of said molding blocks together, the lower surfaces of said molding blocks being curved upwardly whereby a rounded object is molded, and spring means in the head bearing against said knife plate yieldably urging said knife plate downwardly, and locking means engaging said knife plate whereby said knife plate is held against movement.

5. A dough molding machine comprising a frame, a pair of posts rising from the frame, a head reciprocally mounted on said posts, spring means bearing against the head normally urging it upwardly, means engaging the head whereby said head is reciprocated, said head including a top plate, an apron depending from the said top plate, a knife plate slidably mounted in the apron, a plurality of spaced knives depending from the knife plate, molding blocks slidably mounted between adjacent pairs of knives, means coupling all of said molding blocks together, the lower surfaces of said molding blocks being curved upwardly whereby a rounded object is molded, a guide frame depending from the first named frame, said molding block coupling means being guided in the guide frame, a spring engaging said molding block coupling means whereby the molding blocks are held in raised position and stop means on the frame engageable by the molding block coupling means whereby the molding blocks are depressed against the tension of the spring.

6. A dough molding machine comprising a frame, a pair of posts rising from the frame, a head reciprocally mounted on said posts, spring means bearing against the head normally urging it upwardly, means engaging the head whereby said head is reciprocated, said head including a top plate, an apron depending from said top plate, a knife plate slidably mounted in the apron, a plurality of spaced knives depending from the knife plate, molding blocks slidably mounted between adjacent pairs of knives, a band encircling the head, pins extending from each of the molding blocks, said pins extending through the band, said apron having slots therein through which the pins extend, and means engaging said band in the raised position of the head whereby the band and attached molding blocks are lowered in the slots.

7. A dough molding machine comprising a frame, a pair of posts rising from the frame, a head reciprocally mounted on said posts, spring means bearing against the head normally urging it upwardly, means engaging the head whereby said head is reciprocated, said head including a top plate, an apron depending from said top plate, a knife plate slidably mounted in the apron, a plurality of spaced knives depending from the knife plate, molding blocks slidably mounted between adjacent pairs of knives, a band encircling the head, pins extending from each of the molding blocks, said pins extending through the band, said apron having slots therein through which the pins extend, a U-shaped guide frame depending from the first named frame, said band being guided in the last named guide frame, a stop on the guide frame engaging said band to urge the band downwardly in the raised position of the head, and springs engaging said band to urge the same upwardly and raise the molding blocks.

In testimony whereof, I affix my signature.

OSCAR NEUBERT, JR.